United States Patent [19]
Hamar

[11] Patent Number: 5,929,984
[45] Date of Patent: Jul. 27, 1999

[54] SYSTEM AND METHOD FOR GENERATING MULTIPLE PARALLEL BEAMS AND PLANES

[75] Inventor: Martin R. Hamar, Wilton, Conn.

[73] Assignee: Hamar Laser Instruments, Inc., Conn.

[21] Appl. No.: 08/986,113

[22] Filed: Dec. 5, 1997

Related U.S. Application Data

[60] Provisional application No. 60/033,122, Dec. 10, 1996.

[51] Int. Cl.[6] .............................. G01C 1/00; G01B 11/26
[52] U.S. Cl. ...................... 356/146; 356/138; 356/247; 356/141.3; 372/107
[58] Field of Search .................... 356/138, 247, 356/146, 141.3, 153, 139.03, 150, 152.1, 248, 400; 33/276; 372/107, 100, 99, 98; 359/201, 211, 212

[56] References Cited

U.S. PATENT DOCUMENTS

| | | | |
|---|---|---|---|
| 3,771,876 | 11/1973 | Ljunglahl et al. | 356/138 |
| 4,382,680 | 5/1983 | Hamar | 356/247 |
| 4,468,119 | 8/1984 | Hamar | 356/138 |
| 4,566,202 | 1/1986 | Hamar | 356/141.3 |
| 4,674,870 | 6/1987 | Cain et al. | 356/141.3 |
| 4,712,953 | 12/1987 | Witzel et al. | 356/153 |
| 4,714,344 | 12/1987 | Hamar | 356/139.03 |
| 4,815,845 | 3/1989 | Colbaugh et al. | 356/153 |
| 4,840,483 | 6/1989 | Haffner | 356/153 |
| 4,843,372 | 6/1989 | Savino . | |
| 4,889,425 | 12/1989 | Edwards et al. | 356/141.3 |
| 4,942,588 | 7/1990 | Yasui et al. | 372/103 |
| 4,963,022 | 10/1990 | Sommargren | 356/247 |
| 4,985,898 | 1/1991 | Furuya et al. | 372/106 |
| 5,048,030 | 9/1991 | Hiiro | 372/68 |
| 5,144,486 | 9/1992 | Hart | 356/138 |
| 5,144,487 | 9/1992 | Hersey | 356/138 |
| 5,218,770 | 6/1993 | Toga | 356/138 |
| 5,307,368 | 4/1994 | Hamar | 372/107 |

FOREIGN PATENT DOCUMENTS

WO 85/00222  1/1985  WIPO .

*Primary Examiner*—Hoa Q. Pham
*Attorney, Agent, or Firm*—Antony J. Casella; Gerald E. Hespos; Ludomir A. Budzyn

[57] ABSTRACT

A laser system is provided for precisely locating points in space relative to a reference plane. The system includes at least one laser generator capable of sweeping a plurality of mutually perpendicular laser planes and/or one laser plane and one laser beam perpendicular thereto. The system further includes a plurality of laser sensitive targets. Three laser sensitive targets are positioned to lie in the first plane swept by the laser generator. These targets then define a reference plane. The laser generator may be moved periodically and bucked into the previously established reference plane. The second laser plane or the laser beam will be perpendicular to the reference plane at each optional position of the laser generator. Thus, each second laser plane or each second laser beam will be parallel to one another. The system may further include position sensors for precisely defining distances between the parallel laser planes or parallel laser beams.

10 Claims, 4 Drawing Sheets

SYSTEM AND METHOD FOR GENERATING MULTIPLE PARALLEL BEAMS AND PLANES

This application claims the benefit of U.S. Provisional Application No. 60/033,122 filed Dec. 10, 1996.

BACKGROUND OF THE INVENTION

1. Field of the Invention.

The present invention is directed to a system and method for establishing a plurality of parallel laser generated beams and laser generated planes perpendicular to at least one established reference plane.

2. Description of the Prior Art.

Aircraft manufacturers rely on three principal coordinate planes to design and assemble an aircraft. These coordinate planes are a waterline plane, which is substantially parallel to the floor and wings of the aircraft, a buttock plane, which is coincident with the longitudinal axis of the aircraft fuselage and perpendicular to the waterline plane, and a station plane, which is perpendicular to the two aforementioned planes. All dimensions for locating parts inside or outside the aircraft are measured from these three planes. Station plane 0 is the nose of the aircraft. Waterline and buttock dimensions are measured left or right of the master buttock plane of the aircraft and above or below the master waterline plane of the aircraft, respectively.

Many prior art instruments have been used to provide reference lines on the three principal aircraft planes at known offsets for the purpose of setting details. Details, such as seat tracks, stow bin hangers, door locations, etc., have specified locations defined by the three principal planes. Many types of instruments for locating the position of such details relative to the three planes are in the prior art, including, an optical tooling telescope, theodolites, auto collimator, and single-plane laser scanners which use a scanning laser device to generate a flat plane. Various manual and automatic methods of bucking the single flat plane into reference targets inside or outside the aircraft frame are included in the prior art. In some prior art embodiments, the laser plane is used horizontally as a waterline plane and another laser instrument is turned 90° to create a vertical buttock or station plane. These embodiments, however, employ two completely different laser plane generators, with each plane requiring three reference targets to allow the bucking of the laser plane to the aircraft coordinate plane system. Furthermore, both laser plane generators must be bucked into the aircraft coordinate plane system for each location along the fuselage of the aircraft. A considerable amount of time is required to locate the targets for the vertical laser plane generator and to properly align the vertical scan plane with the targets at each desired location, in addition to aligning the horizontal plane generator with the horizontal targets. Thus, there is a need to simply and quickly establish a plurality of vertical planes perpendicular to a horizontal reference plane.

The assignee of the subject invention also is the owner of U.S. Pat. No. 5,307,368 which is directed to an apparatus that can generate three mutually perpendicular laser beam. Additionally, the apparatus include as many as three rotating beam diverters aligned respectively with the three mutually perpendicular laser beams. Each beam diverter disclosed in U.S. Pat. No. 5,307,368 is operative to deflect the incoming laser beam through precisely 90°. Thus, rotation of any such beam diverter about an axis coincident with the incoming laser beam will cause the diverted laser beam to sweep a flat optical plane perpendicular to the incoming laser beam. Thus use of three such rotating beam diverters enable the apparatus to sweep three mutually perpendicular planes.

In manufacturing, there are many applications where the parallelism of several reference lines, bores, axes of rotation, etc. must be measured. For example, the parallelism of central bores of gears in a large gear case is crucial for optimal performance and longevity.

It is an object of the present invention to provide a system and method of generating simultaneously or sequentially a plurality of parallel laser beams perpendicular to a single reference plane which enable the parallel alignment of reference lines, bores and axes of rotation.

It is also an object of the subject invention to provide a system and method of generating a reference plane from which a plurality of perpendicular laser scan planes may be easily generated simultaneously or sequentially.

A further object of the subject invention is to provide a system and method for generating two mutually perpendicular reference planes with the ability to easily simultaneously or sequentially generate a plurality of laser scan planes which are mutually perpendicular to the two reference planes.

It is yet another object of the subject invention to provide a system and method for generating a reference plane and a plurality of perpendicular laser beams or laser scan planes relative to the reference plane, with coordinate measuring devices provided to determine the horizontal and vertical positioning of the generated laser beams and planes within the reference plane.

SUMMARY OF THE INVENTION

The afore-mentioned objects are met by a system and method including at least one laser scan plane generating apparatus capable of generating a reference plane and at least one beam or laser plane perpendicular to the reference plane, the laser plane generating apparatus being bucked into three fixed photosensitive targets which define the reference plane.

In one embodiment of the subject invention, the system includes a laser alignment apparatus capable of generating a plurality of mutually perpendicular laser scan planes such as that disclosed in U.S. Pat. No. 5,307,368, granted to the inventor herein. The subject invention utilizes a laser alignment apparatus which generates at least two mutually perpendicular laser scan planes as disclosed in U.S. Pat. No. 5,307,368. The disclosure of U.S. Pat. No. 5,307,368 is incorporated herein by reference and discloses a laser alignment apparatus which is capable of generating a plurality of mutually perpendicular laser scan planes and laser beams. With such a device, only one laser generating instrument is required to achieve a tightly controlled alignment system. The orthoganality of the laser scan planes is maintained by the construction of the laser generating instrument and it is not critically dependent upon the reference points in the aircraft being correctly located. Using reference targets to reestablish parallelism and coincidence of the laser scan planes from one location to another, the laser can be moved to different locations in the aircraft. As an example, if three waterline targets are used for referencing one plane, and two buttock plane targets are used for adjusting azimuth of the instrument which are in alignment with one of the waterline targets, then the instrument can be moved anywhere from the front of the aircraft to the rear of the aircraft and reestablished or bucked into the same set of five reference targets. In effect then, the laser instrument itself can be moved to vary the fore and aft station plane locations in the aircraft. After bucking into the same reference targets, the new reference planes will be exactly parallel with their location in the prior position.

In a second embodiment, the subject invention comprises the laser generating apparatus disclosed in U.S. Pat. No. 5,307,368 which is configured to generate a laser plane and a straight through laser beam from one face thereof. As disclosed in U.S. Pat. No. 5,307,368, a penta-prism is provided which has two positions relative to the generated laser beam. In one position, the penta-prism is coincident with the generated laser beam and rotated to create a scan plane perpendicular to the generated beam. In a second position, the penta-prism is not coincident with the generated laser beam thereby allowing a beam to be emitted from the apparatus. In this embodiment of the subject invention, the scan plane generated by the laser generating apparatus is bucked into three fixed reference targets to define a reference plane. Thereafter, a laser beam may be generated to locate a reference axis perpendicular to the reference plane. The laser generating apparatus can be moved within the reference plane by simply bucking the apparatus into the three fixed targets from any point within the reference plane. With the reference plane defined, a laser beam may be generated perpendicular to any location on the reference plane. Significantly, parallelism is achieved between the plurality of generated straight through laser beams. Alternatively, more than one laser generating apparatus may be used which is bucked into the same three fixed reference targets thereby allowing the simultaneous generation of a plurality of parallel straight through laser beams.

A third embodiment of the subject invention employs the same conceptual underpinning of the second embodiment but relies on a different structural apparatus to function. In this embodiment, a laser generating apparatus is employed which is structurally similar to the laser generating apparatus disclosed in U.S. Pat. No. 5,307,368. However, the structure of the laser generating apparatus of the third embodiment of the subject invention includes a rotating beam splitting penta-prism. With such an arrangement, the laser generating apparatus is capable of simultaneously generating a scan plane and a laser beam.

Additionally, a device, such as an interferometer or laser tracker, may be used to measure the position of the laser generating apparatus relative to the reference plane. One device may be used to measure the position of the laser generating apparatus left and right and a second device may be used to measure its position up and down. With position measuring capability, not only will parallelism be achieved between a plurality of generated scan planes and beams, but the position of the generated beams and planes will also be known. This combination provides a special form of coordinate measuring machine that could produce a series of parallel beams and scan planes whose dimensional separation would be known. The use of a laser tracker enables the use of polar coordinates to positively locate objects. More particularly, polar coordinates enable location to be determined by measuring angles and distance from known reference points.

DETAILED DESCRIPTION OF THE INVENTION

Figure 1:
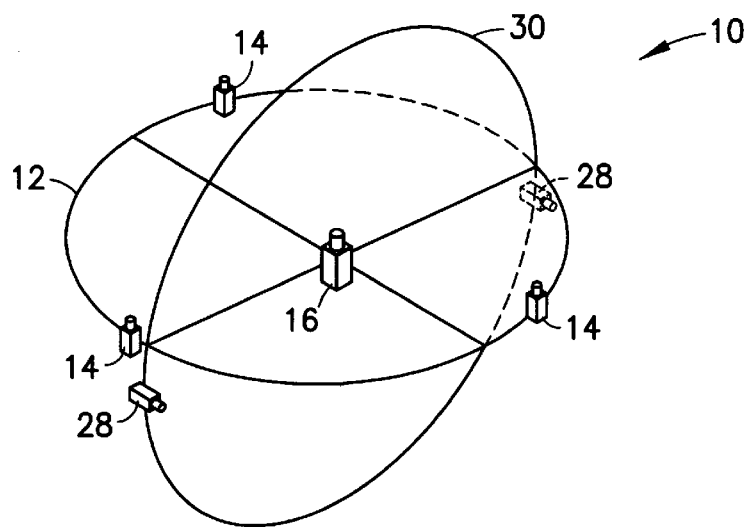
FIG. 1 is a schematic of the first embodiment of the subject invention.

The first embodiment of the subject invention is shown generally in FIG. 1. A system 10 is provided for generating a plurality of parallel laser scan planes perpendicular to a reference plane 12. The reference plane 12 is defined by at least three first photoelectric targets 14. The first targets 14 are provided with mountings which allow the targets 14 to be adjusted so that the first targets 14 may be aligned to be coplanar, and securing mechanisms to rigidly secure the targets 14 in desired coplanar positions. The first targets 14 may be aligned using a laser generator, as described below, or secured to predetermined coplanar locations.

Figure 2:
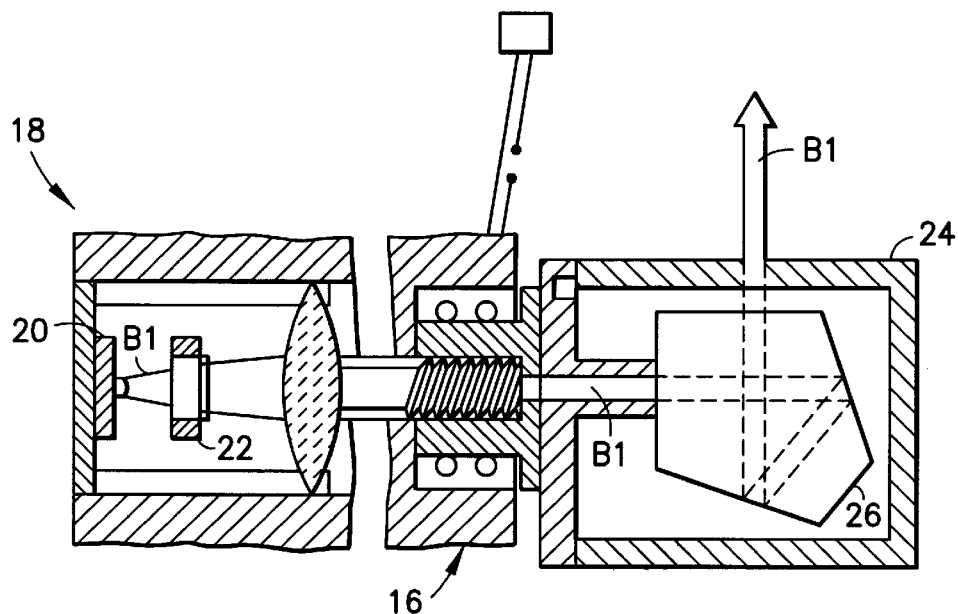
FIG. 2 is a schematic of the laser generator used in the subject invention.

The system 10 comprises a laser generator 16 such as that disclosed in U.S. Pat. No. 5,307,368. Referring to FIG. 2, a laser 18 is shown which is housed by the laser generator 16. The laser generator 16 may include up to three lasers 18 all having substantially identical constructions and formed to generate three substantially perpendicular beams. The laser 18 includes a laser emitting diode 20 which is formed to generate a laser beam B1 through a tilt plate 22 which is mounted in the laser generator 16 to allow for adjustment of pitch and yaw of the beam B1 relative to the laser generator 16. The laser beam B1 is directed into a scanner 24 rotatably mounted to the laser generator 16 which includes a penta-prism 26. The penta-prism 26 is formed to redirect the laser beam B1 in a direction which is substantially perpendicular to the direction of entry of the laser beam B1 into the penta-prism 26. The scanner 24 is formed to be rotatably driven so that the exiting laser beam B1 is sept 360° about the axis of rotation of the scanner 24 thereby generating a laser scan plane. The scanner 24 is hingedly mounted to the laser generator 16 to allow for the re-positioning of the scanner 24 into a position which permits the laser beam B1 to continue linearly from the laser generator 16 without the 90° reflection caused by the penta-prism 26.

Figure 3:
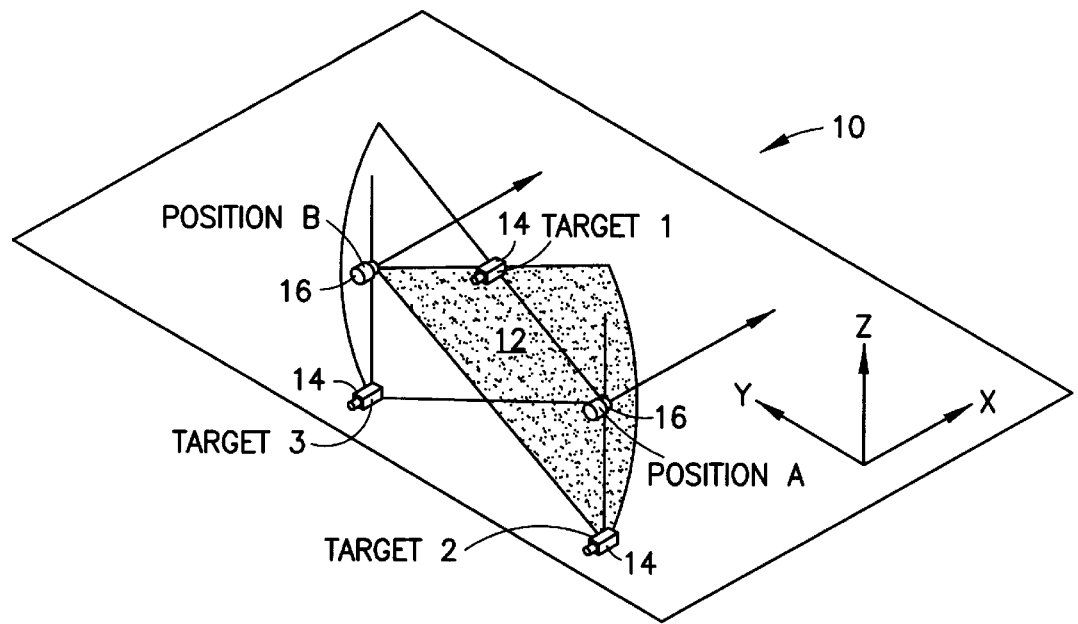
FIG. 3 is a schematic of one configuration of the second embodiment of the subject invention.

In one configuration of the first embodiment of the subject invention, as shown in FIG. 3, the laser generator 16 generates two perpendicular laser scan planes. One of the laser scan planes is selected to define the reference plane 12. The laser scan plane is generated and the first targets 14 are bucked in and rigidly secured to define the reference plane 12 coplanar with the generated scan plane. Once the laser generator 16 and the first targets 14 are properly positioned in coplanar alignment, the laser generator may be operated to generate a second laser scan plane perpendicular to the reference plane established by the first targets 14. The laser generator 16 can be moved and repositioned within the reference plane 12 by bucking in or adjusting the laser generator to the previously positioned first targets 14. This allows the laser generator 16 to generate a new laser scan plane perpendicular to the reference plane 12 from the new location of the laser generator 16 within the reference plane 12. The laser generator 16 can be moved a plurality of times in this manner to create a plurality of laser scan planes perpendicular to the pre-established reference plane defined by the first targets 14. All subsequently generated laser scan planes which are perpendicular to the reference plane 12 along a single coordinate axis must necessarily be parallel.

In an alternate configuration, the laser generator 16 may be configured to generate three mutually perpendicular laser scan planes each defining a separate coordinate axis. Although the laser generator 16 generates the laser scan planes to be mutually perpendicular, two additional second targets 28 may be provided to define a second reference plane 30, as shown in FIG. 1. With two defined reference planes, an operator of the system 10 may properly define a location in space relative to two coordinate axes as defined by the first and second reference planes 12, 30. The laser generator 16 may be bucked in at any point along the intersection of the first and second reference planes 12, 30 to generate a third laser scan plane mutually perpendicular to the first and second reference planes 12, 30 such that all generated third laser scan planes will necessarily be parallel.

In a second embodiment, the system 10 may employ a laser generator 16 configured to generate a laser scan plane and a perpendicular laser beam from a single face, using the apparatus shown in FIG. 2. As shown in FIG. 3, the second embodiment of the system 10 also comprises three first targets 14 which define the reference plane 12. With the first targets 14 defining the reference plane 12, the laser generator 16 may be bucked into the three first targets 14 from any position within the reference plane 12. Referring to FIG. 3, the laser generator 16 may be located at position A and bucked into the reference targets 14 and subsequently located at position B and also then bucked into the reference target 14. Laser beams generated at positions A and B by the laser generator 16 are perpendicular to the reference plane 12 and necessarily parallel.

Figure 4:
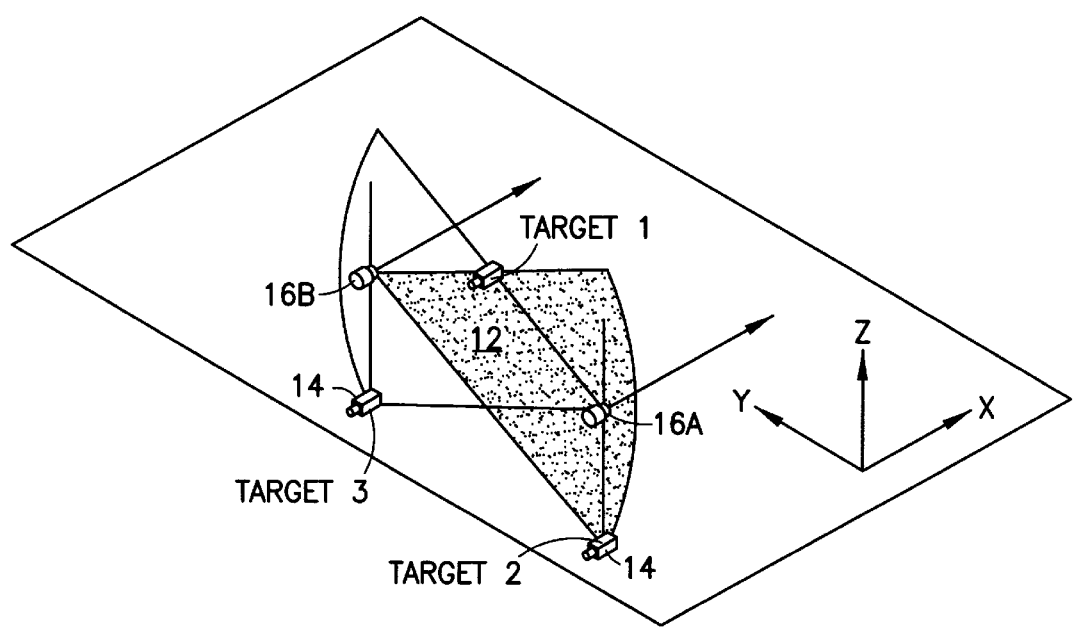
FIG. 4 is a schematic of a second configuration of the second embodiment of the subject invention.

Alternatively, as shown in FIG. 4, a plurality of laser generators 16A and 16B may be used to simultaneously generate parallel beams. For example, as shown in FIG. 4, a second laser generator 16B may be provided which is bucked into the reference targets 14 along with the laser generator 16A. Consequently, the laser generators 16A and 16B sweep planes that are coplanar, and laser beams generated by the respective laser generators 16A and 16B are perpendicular to the reference plane 12 and parallel to one another.

In the second embodiment of the invention, the laser beam is generated separately from the laser scan plane by the laser 18 of the laser generator 16. The penta-prism provided with the laser generator 16 must be selectively located to generate a desired laser beam or scan plane, as described above. In the third embodiment of the subject invention, the laser generator 16 is modified to include a rotating beam splitting penta-prism. Referring to FIG. 2, with a beam splitting rotating penta-prism, the laser beam B1 would simultaneously exit the scanner 24 in two directions, one direction being collinear with the laser beam B1 entering the penta-prism and the second direction being perpendicular thereto.

Figure 5:
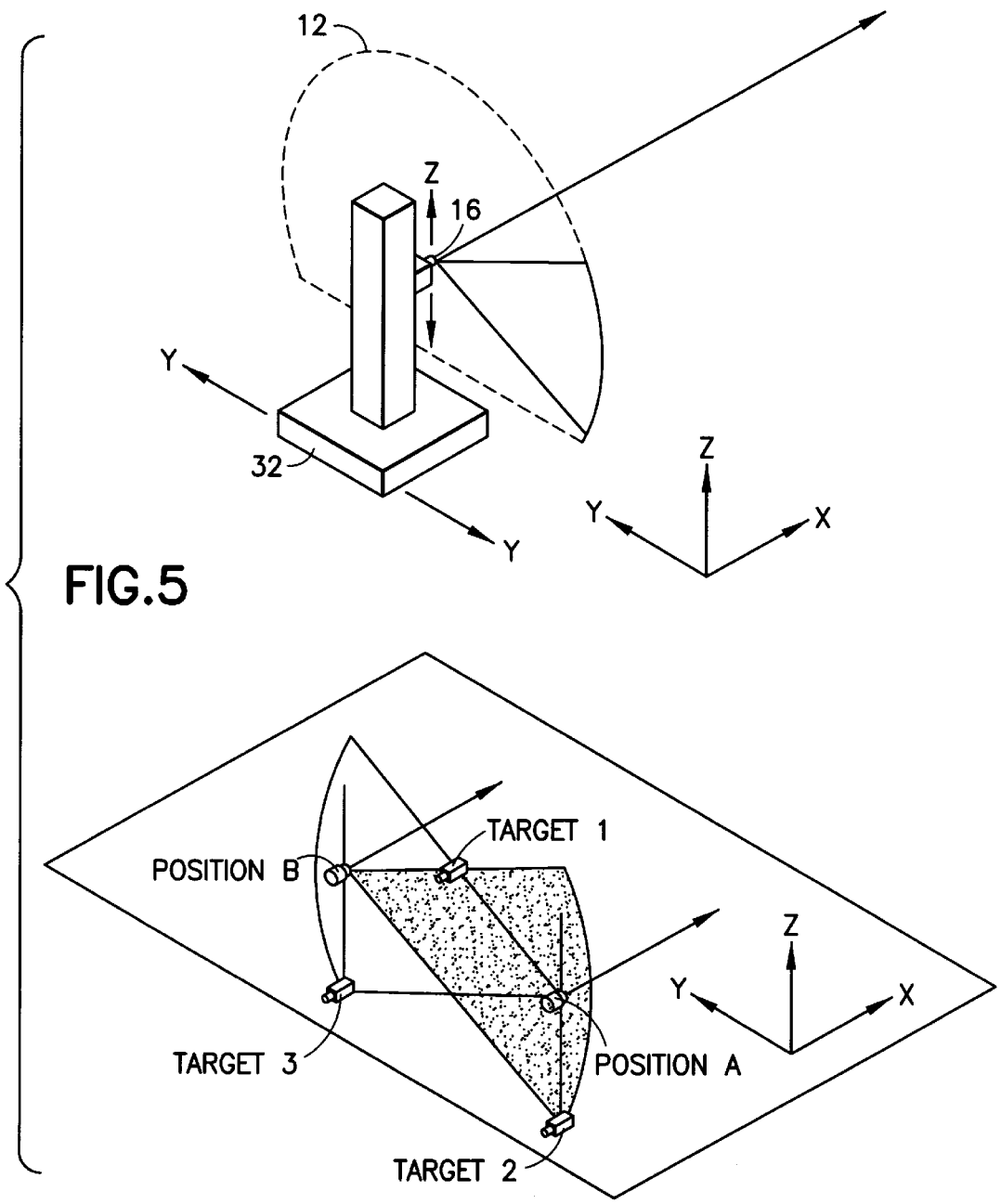
FIG. 5 is a perspective view of a position measuring device which can be used with the subject invention.
Figure 6:
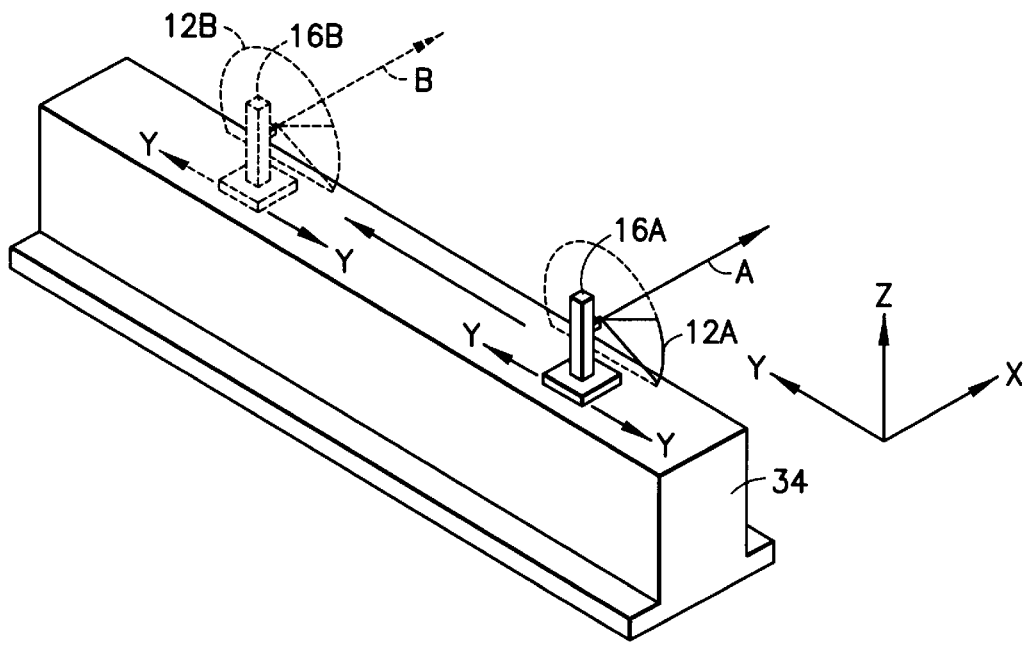
FIG. 6 is a perspective view of an alternate position measuring device.

Additionally, as shown in FIGS. 5 and 6, an slide scale interferometer 32, laser tracking device or other laser operative or electronically operated distance/displacement locator may be used in combination with any of the embodiments of the invention to measure the position of the laser generator 16 relative to the reference plane 12, 30. Referring to FIG. 5, the laser beam is generated along the X axis with a reference plane 12 being aligned with the Y and Z axes. The slide scale interferometer 32 may measure the Y and Z positions of the beam relative to the reference plane 12. As shown in FIG. 6, a pair of laser generators 16A and 16B are used simultaneously on a position measuring device 34 to measure relative distances between two simultaneously generated laser beams A and B which are generated to be perpendicular to coplanar reference planes 12A and 12B. With the apparatus of FIG. 6, the laser beams A and B are known to be parallel, and the distance therebetween is known.

Figure 7:
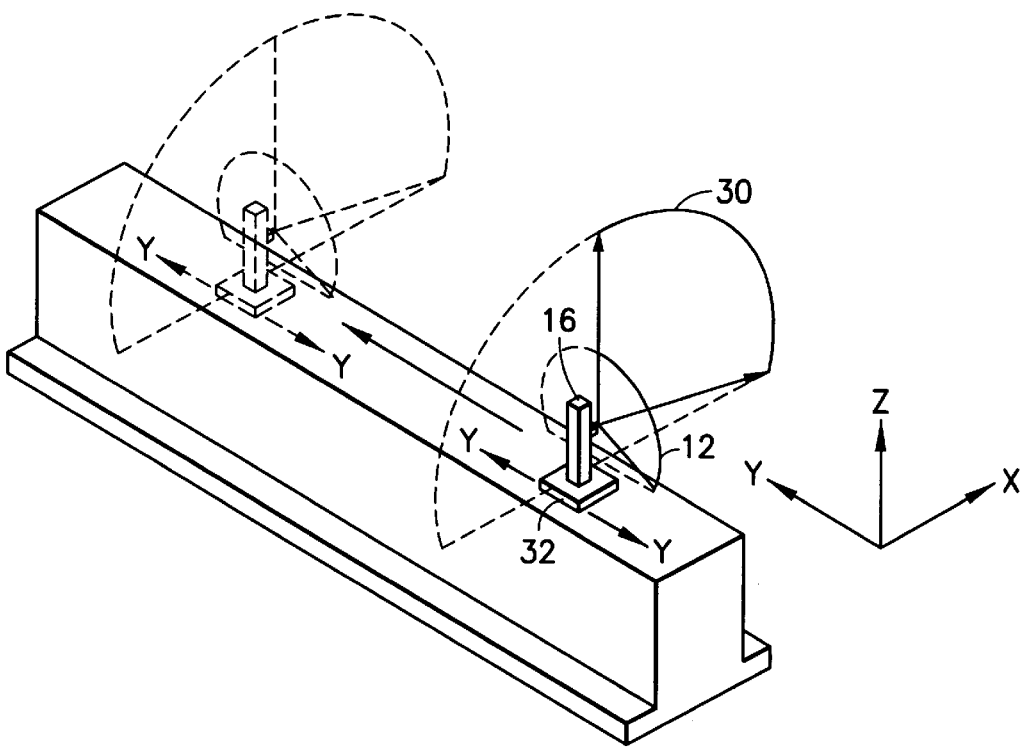
FIG. 7 is a perspective view of the laser device configured for generating a reference plane and scan planes perpendicular to the reference plane and at known distances from one another.

FIG. 7 shows a variation of the system shown in FIG. 6. More particularly, FIG. 7 includes one of the above-described laser generators 16 capable of sweeping a reference plane 12 and a scan plane 30 perpendicular thereto. The laser generator 16 is mounted on a slide scale interferometer 32 or other known position measuring apparatus and is movable in the YZ plane. The plane 30 is perpendicular to the scan plane 12. Thus, as the apparatus 16 moves to different Y-access positions, the respective scan planes 30 will be precisely parallel to one another. The apparatus of FIG. 6 or the apparatus of FIG. 7 can be used, for example, to precisely locate fixtures along the length of an aircraft.

What is claimed is:

1. A laser system for generating a plurality of parallel laser projections including laser scan planes and laser beams perpendicular to a reference plane, said system comprising:

at least three reference targets for defining the reference plane, said targets being adjustable and having fixation means for rigidly fixing said targets in locations coplanar with the reference plane; and at least one laser generator for generating a first laser scan plane and a laser projection perpendicular to said first laser scan plane, said first laser scan plane being bucked into the reference targets such that said first laser scan plane is coplanar with the reference plane, wherein said at least one laser generator is capable of movement to a plurality of locations within the reference plane and generation of a first laser scan plane coplanar to the reference plane and a perpendicular laser projection from each of said locations, whereby said generated laser projections are formed to be parallel.

2. A system as in claim 1, wherein the reference plane is a first reference claim, the system further comprising at least two additional targets arranged to be coplanar with a second reference plane perpendicular to the first reference plane, and wherein said laser projection is a second laser scan plane bucked into said additional targets such that said second laser scan plane is coplanar with the second reference plane.

3. A system as in claim 2, wherein said at least one laser generator generates at least one laser scan plane mutually perpendicular to both said first laser scan plane and said second laser scan plane.

4. A system as in claim 1, further comprising a distance measuring device for measuring spatial distances between said locations.

5. A system as in claim 1, wherein said laser projection is a laser beam, and wherein said at least one laser generator simultaneously generates said laser beam and said first laser scan plane.

6. A system as in claim 1, wherein said laser projection is a straight laser beam, and wherein said at least one laser generator selectively generates said laser beam and said first laser scan plane.

7. A method for generating a plurality of parallel laser projections including laser scan planes and laser beams, said method comprising the steps of:

providing at least one laser generator capable of generating a first laser scan plane and at least one laser projection perpendicular to said first laser scan plane;

generating said first laser scan plane;

aligning three targets to be coincident with said first laser scan plane, said targets defining a reference plane;

fixing said targets;

generating at least one laser projection from the laser generator in a first position, said at least one laser projection being perpendicular to the reference plane;

moving said laser generator to a second position within the reference plane;

bucking in said first laser scan plane into said fixed targets such that said first laser scan plane is coplanar with the reference plane; and generating at least one laser projection perpendicular to said reference plane, whereby said generated laser projections generated from said positions are parallel.

8. A method as in claim 7, further comprising the steps of providing a distance measuring device, and measuring the distance between said positions.

9. A method for generating a plurality of parallel laser projections including laser scan planes and laser beams, said method comprising the steps of:

providing at least one laser generator capable of generating a first laser scan plane, a second laser scan plane and at least one laser projection, said first laser scan plane, said second laser scan plane and said at least one laser projection being formed to be mutually perpendicular;

generating said first laser scan plane;

aligning three first targets coplanar with said first laser scan plane which define a first reference plane;

fixing said three first targets;

generating said second laser scan plane;

aligning two second targets coplanar with said second scan plane and with one of said first targets to define a second reference plane perpendicular to said first reference plane;

fixing said second targets;

generating at least one laser projection from a first position mutually perpendicular to said first reference plane and said second reference plane;

moving said at least one laser generator to a second position within the first reference plane and the second reference plane;

bucking in said laser generator into said three first targets and said two second targets, such that said first laser scan plane is coplanar with the first reference plane and said second laser scan plane is coplanar with the second reference plane; and generating at least one laser projection mutually perpendicular to the first reference plane and the second reference plane, whereby said generated laser projections generated from said positions are parallel.

10. A method as in claim 9, further comprising the steps of providing a distance measuring device, and measuring the distance between said positions.

* * * * *